April 8, 1969  F. Z. DAUGHERTY  3,437,185

BI-DIRECTIONAL CLUTCH WITH TWO-WAY OVERRIDE

Filed July 10, 1967

INVENTOR.
FRANK Z. DAUGHERTY
BY
*Ely & Golrick*
ATTORNEYS the cover or environmental structure; the housing here comprising a hollow main member 11 rotationally supporting an input member 12 extending therethrough and a housing cover plate 13 bolted to the cylindrical flange or wall 11a and

United States Patent Office 3,437,185
Patented Apr. 8, 1969

3,437,185
BI-DIRECTIONAL CLUTCH WITH TWO-WAY OVERRIDE
Frank Z. Daugherty, Kent, Ohio, assignor to Ametek, Inc., a corporation of Delaware
Filed July 10, 1967, Ser. No. 652,154
Int. Cl. F16d *41/04, 41/08*
U.S. Cl. 192—26          11 Claims

ABSTRACT OF THE DISCLOSURE

A bi-directional clutch with two-way override comprising a shafted female circularly cylindrically surfaced input member; an aligned shafted roughly elliptically cylindrically male surfaced output member having diametrical edge-slots on its major axis; four curved wedge-like clutching elements complementary to adjacent female and male surfaces when in clutch engaging contact, paired on respective sides of the axis normally biased to engagement by spring means between their adjacent broad ends; and a rotatable release member providing a respective lug projecting between adjacent narrow element-ends and, with clearance, into a said edge-slot, for selectively declutching either diametrically opposite element pair before engaging and rotating the output member. Release stop means effect automatic release.

---

The present invention is concerned generally with a clutch which is normally engaged to drive an output member in either direction, but is automatically releasable upon application of torque through an element other than an input member. It is the general object of the invention to provide a novel form of clutch relatively simple in construction and capable of transmitting relatively high torque for its size and construction, which is especially adapted for use in actuating systems for rotary valves to be driven in either direction usually between two extreme positions, though having other applications.

Another object is to provide a clutch device of the character described which permits ready manual operation of a device thereby connected to a rotational power source, by release of the clutch output member from an input member connected to said source so that the device may be moved independently of the source.

A further object of the invention is to provide an improved arrangement, for the stated objects and purposes, of a known combination of female circularly cylindrical and male roughly elliptically cylindrical clutch components with interposed clutching elements normally biased into clutch-engaged relation.

The invention, as applied in one embodiment from which other objects and advantages will appear, is hereinafter described in the following description, with reference to the drawing wherein.

Figure 1:
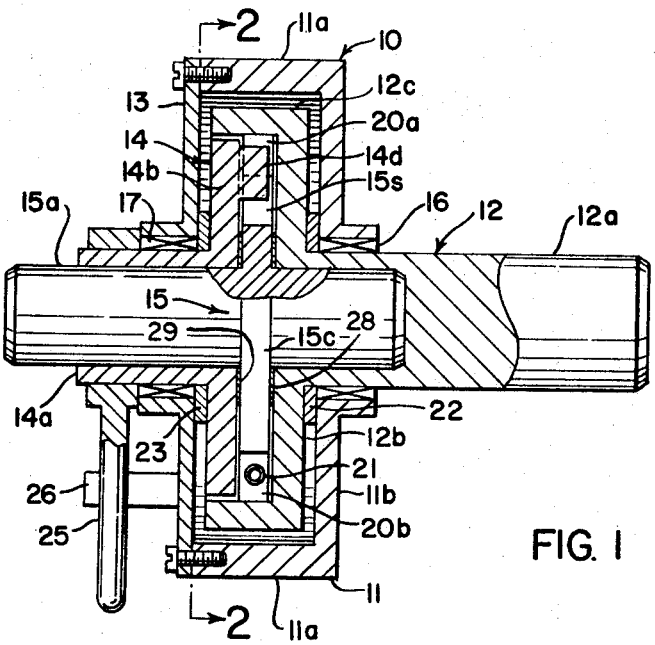
FIG. 1 shows a particular embodiment of the clutch mechanism in a generally axial section taken irregularly as indicated by the line 1—1 in FIG. 2.

In the embodiment of the invention shown in the drawing, for the clutch mechanism there is provided a housing 10 of appropriate form adapted to the environment of use, e.g., to be attached to a gear motor unit of which the rotational output motion is to be transmitted through the clutch, or to be attached to a driven device, or to other environmental structure; the housing here comprising a hollow main member 11 rotationally supporting an input member 12 extending therethrough and a housing cover plate 13 bolted to the cylindrical flange or wall 11a and directly rotationally supporting a clutch control member 14 and thereby an output member 15 extending through and rotatable in member 14.

Member 12 includes a shaft portion 12a journalled in a bushing or sleeve bearing 16 inserted in the centrally apertured housing end wall 11b, and within the housing a female or internal circularly cylindrical clutching surface provided by a short circularly cylindrical flange 12c, here shown integrally joined to shaft 12a through a radial disc or wall portion 12b; in effect affording a face-recessed enlargement on the inboard shaft end receiving the other clutch components to be described.

Member 15 is here shown as comprising a roughly elliptical disc enlargement 15c fixed on a shaft 15a. The latter is supported in alignment with shaft 12a by rotatable reception of its inboard end in a blind bore, coaxial with the female circularly cylindrical clutching surface of 12c, through wall 12b into shaft portion 12a; and by its other end projecting through and rotationally supported in the control member tubular hub 14a in turn directly journalled in the sleeve bearing 17 in the centrally apertured second housing end wall provided by cover 13.

Figure 2:
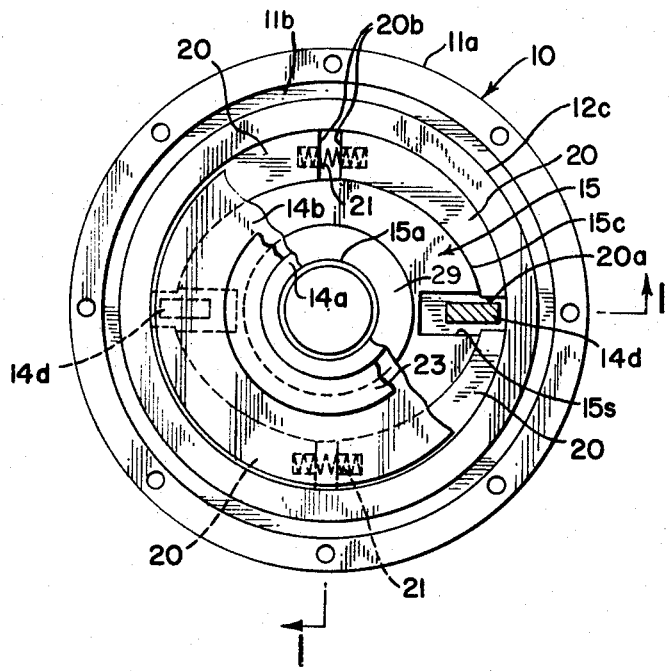
FIG. 2 shows the clutch unit, with housing cover removed and certain parts broken away, as an end view taken from the direction indicated by line 2—2 in FIG. 1.

As best seen in FIG. 2, the symmetrical enlargement 15c, disposed in the face recess of 12, is in external shape roughly an elliptical cylinder as a male clutch surface with axis coincident with the axis of the system; but has a pair of opposed rectangular end notches or slots 15s centered on the major elliptical axial plane, which may be termed radial in the sense of extending in the direction radial to the axis of member 15. Four identical clutching shoe elements 20 are disposed between and have convex external and concave internal surfaces which are respectively complementary to the internal circularly cylindrical surface of clutch member 12 and, at the time the clutch is engaged, to the external elliptically cylindrical surface of clutch member 15.

The segments or elements 20 do not entirely circumferentially fill the space between flange 12c and enlargement 15c, the ends of adjacent segments being spaced from each other for operative displacement and accommodation of other elements to be described. As means biasing the clutch to engaged condition, between the broad ends 20b of each of the segment pairs lying on the respective sides of the major axial plane, there are interposed respective compression springs 21, each supported, at the broad end gaps occurring at the minor elliptical axial plane, by reception of its opposite ends in corresponding aligned recesses in the broad end faces.

At the major elliptical axial plane the spacings between the narrow adjacent segment ends 20a define slots normally narrower than the end slots 15s of the member 15 normally aligned therewith jointly to receive respectively the lugs 14d diametrically disposed on and axially projecting from the control member disc portion 14b received within the confines of flange 12c and as a retainer overlying 15c and the segments 20. End spacers or thrust washers 22, 23 are preferably interposed between end wall 11b and radial wall portion 12b and between cover end wall 13 and release disc 14b. Similarly then spacer discs or washers 28, 29 preferably are interposed between the end faces of enlargement 15c and respectively the radial wall portion 12b and the release disc 14b.

On the control or release member 14, the tubular portion 14a projecting a short distance out of cover 13 has a manually graspable and operable control lever arm 25 secured thereto, which may further serve as an output shaft position indicator; and also by cooperation with say a pair of abutments or stops as 26 on the cover or environment, as part of an automatic disengagement means for limiting rotation of the output between two angular positions.

In operation, torque input at 12a will drive 15a in a corresponding direction in consequence of the biasing by springs 21 of elements 20 in wedge-like manner between the opposed surfaces of 12c and 15c; which for either direction of rotation will cause the elements, in a corresponding diametrically opposed pair of the elements 20, frictionally to be urged, so to speak, up the underlying slope of member 15c developing increasing normal forces at the contacting surfaces for effective driving relation. Conversely were 15 the input member, the similar relative motion of 12 relative to 15 would have a like effect. If stop abutment means such as 26 are not present, the drive in either direction will proceed with continuous input rotation unless and until some external agency should intervene to restrain the release arm 25.

However, when the release arm 25 is restrained from rotation or, to the same effect, when the arm 25 is moved with the other members stationary, in consequence of the clearance provided by the larger width of 15s as compared with the slot width defined between narrow ends of elements 20 when the latter are at their normal maximum approach under the biasing, the lugs 14d encounter the narrow ends of a diametrically opposite pair of the elements 20 before encountering the walls of the slots 15s to move the engaged pair of elements down the underlying "slope" of 15c relieving wedging or frictional engagement, freeing member 12 from 15 before the lugs engage the walls of 15s and stop the member 15; so that 12 may overrun without damage to the clutch or associated mechanisms, or where the system is stationary and manual operation is involved, freeing member 15 from 12 before the lugs pick up member 15. In the latter case 15 may be rotated without having to apply torque to rotate a driving power source attached to 12, a torque which may be considerable where 12 is driven by say an electric motor through a high ratio reduction gearing train.

By the use of a spaced pair of abutments 26, the clutch will automatically disengage at either of two angular positions of output member 12 corresponding to the locations of such abutments; advantageous, for example, where a plug-type valve is driven between open and closed position; or with a single abutment providing practically a single rotation release clutch for successively opposed directions of rotation.

The embodiment of the drawing is the minimum particular case (with $N=2$) of the general structure where for a balanced symmetrical operation of forces (as contrasted with the case of $N=1$) a plurality of N such arcuate male surfaces is present, each successive pair of male surfaces separated by a respective one of N notches or slots such as 15s in what may be termed a respective lobe region; with N pairs of like clutch elements, one pair in each such space; and N lugs on the clutch release disc.

For convenience of description the male clutch member 15 has been designated as providing a roughly elliptical cylindrical surface and relations of parts described in terminology pertaining to elliptical geometry. However, in the form of the invention shown in the drawings, actually each long arcuate side surface between the slotted ends or "lobe" regions of the member 15 is conveniently formed as a portion of a respective circularly cylindrical surface having a suitable radius of curvature and axis of curvature eccentric from that of the female surface of member 12, the respective axes of curvature both lying parallel to, equispaced from and coplanar with the axis of rotation of the system, therefore of the circularly cylindrical surface of 12; the net and necessary effect being to provide, between each male arcuate side surface portion and the female surface, a space which similarly continually decreases in radial dimension toward its ends from a bisecting axial plane, the shape of 15c being then rotationally symmetrical relative to the axis of the system.

Use of eccentric circularly cylindrical male surfaces, rather than noncircularly cylindric or other configurations as often used in roller clutches, has the advantage that all cooperating clutching surfaces, not only on the input and output members but also on the clutching elements or segments, are therefore circularly cylindrical and are accordingly easy to produce by grinding operations.

The radius of curvature of the arcuate male surfaces for a given radius in the female surface, and the eccentricity of the axes of curvature of the male surfaces, therefore the "arcuate taper" and size of the clutch elements, can be varied considerably, depending upon the torque to be transmitted, materials used and other design considerations. The more gradual the increase of spacing between male and female surfaces the greater is the torque transmissible, but conversely at times the greater the releasing force which may be required to be transmitted through the release lugs to the segments. The size of the arcuately tapering clutching elements for a desired "taper" in a radial direction will be dictated in part by the biasing means used at the broad ends as well as the minimum thickness that is useable at the narrow ends against which the release lugs work. Thus the radius of curvature of male surfaces may be equal to, greater or less than that of the female surfaces with eccentricity of the male surfaces appropriate to the form and number of pairs of the segment elements desired. Where $N=1$, the forces involved in the clutch operation become unsymmetrical or unbalanced relative to the rotational axis of the system and particular attention has to be given to bearing requirements; wherefore it is preferred that N represent a plurality of clutch element pairs.

I claim:
1. A bi-directional clutch with two-way override, comprising a first rotatable clutch member having a circularly cylindrical internal female clutch surface coaxial with its axis of rotation, a second rotatable clutch member coaxially aligned with the first member and having an edge-slotted disc portion with an arcuate male external clutch surface portion terminated at opposite ends by slot walls and disposed within the space circumscribed by the internal surface and defining with at least a portion of the surrounding circularly cylindrical surface a space similarly decreasing in radial dimension from either side of the portion of an axial plane lying to one side of the axis and bisecting said surface,
    a pair of like clutch elements disposed in said space, said elements normally urged by biasing means into endwise spaced relation of the adjacent broad ends thereof and to have narrow ends normally overhanging respective ends of the said external surface,
    adjacent narrow overhanging ends of clutch elements spaced from each other, said elements having convex external and concave internal surfaces complementary to the said female and male surfaces contacted thereby at normal biased disposition,
    a clutch release member rotatable relative to the second clutch member and having a release lug projecting between adjacent narrow ends of clutch elements whereby, upon relative rotational movement between said release member and either of said clutch members, a clutch element shifting against spring bias is effected to release said clutch members from each other.

2. A clutch as described in claim 1, wherein there are two said arcuate male surface portions and two pairs of said clutch elements.

3. A bi-directional clutch with two-way override, comprising a first rotatable clutch member having a circularly cylindrical internal female clutch surface coaxial with its axis of rotation, a second rotatable clutch member coaxially aligned with the first member and having a disc portion with a symmetrical external male clutch surface disposed within the space circumscribed by the internal surface,
    said external surface comprised of a plurality N of like arcuate surface portions disposed about the axis of rotation in a rotationally symmetrical arrangement with the axis of rotation parallel to said surface portions, each arcuate surface portion bisected by and symmetrical to a plane including the said axis and each defining with the surrounding circularly cylindrical surface a space similarly decreasing in radial dimension from either side of the bisecting plane whereby successive arcuate surface portions define lobe regions on the second clutch member, said disc portion radially edge slotted at each lobe region, a respective pair of like clutch elements disposed in each said space, said elements of each pair urged by biasing means into endwise spaced relation of adjacent broad ends thereof and to have narrow ends normally overhanging respective slots, the narrow overhanging ends of clutch elements spaced at each slot, said elements having convex external and concave internal surfaces complementary to the said female and male surfaces contacted thereby at normal disposition, a clutch release member rotatable relative to the second clutch member and having a plurality of N release lugs each projecting axially between the adjacent narrow ends of clutch elements and at least one lug projecting into the associated said slot, whereby upon relative rotational movement between said release member and either of said clutch members clutch elements are shifted against spring bias to release said clutch members from each other.

4. A clutch as described in claim 3, wherein N is equal to 2.

5. A clutch as described in claim 3, wherein each said arcuate surface portion is a portion of a circular cylinder with radius of curvature other than that of said circularly cylindrical internal clutch surface.

6. A clutch as described in claim 5 wherein N is equal to 2.

7. A clutch as described in claim 3, wherein said disc portion is approximately elliptically cylindrical in shape and said slots are located in the ends thereof to provide a said external surface wherein N is equal to 2.

8. A clutch as described in claim 3 including a housing enclosing and rotatably supporting said clutch members, said clutch members having respective shaft portions extending through and rotatably supported by opposed housing wall portions;

said clutch release member comprising a disc within the housing bearing said lugs and having a coaxial tubular portion journalled in and projecting through one housing wall, with the second clutch member shaft portion rotatable in and extending through said tubular portion thereby to be supported by said one housing wall;

a clutch release arm secured on the projecting outboard end of the tubular portion;

and arm stop means on said one housing wall to cause automatic release of said clutch upon the arm encountering said stop means; whereby said clutch may be disengaged by movement of said arm when the clutch members are stationary or by said automatic release.

9. A clutch as described in claim 3, wherein:

the first said clutch member comprises a shaft journalled in one wall of a housing, and an enlargement within the housing fixed on the shaft end and having a face recess opposite the shaft surrounded and defined by said circularly cylindrical internal clutch surface;

the second clutch member comprises a shaft aligned with the first shaft and projecting through a housing wall opposite the first said wall and the said disc portion received in said face recess and having a circumferential disc edge providing said external male clutch surface;

said release member comprising a clutch release disc rotatable on the shaft of the second member and bearing said lugs, and providing a retainer for said elements in the recess;

and including means for blocking movement of said release disc upon rotation to a selected position in either direction.

10. A clutch as described in claim 9, wherein each said arcuate surface portion is a portion of a circular cylinder with radius of curvature other than that of said circularly cylindrical internal clutch surface, and N is equal to 2.

11. A clutch as described in claim 10, wherein said release member has a tubular portion journalled in and extending through the second said wall and carrying a clutch release arm on a projecting end thereof; the second said shaft projecting through and supported in the second wall by said tubular portion.

References Cited

UNITED STATES PATENTS

| 1,859,600 | 5/1932 | Prettyman | 192—43 |
| 2,712,246 | 7/1955 | Zakrajsek | 192—33 XR |
| 3,044,590 | 7/1962 | Madsen | 192—45.1 XR |

CARLTON R. CROYLE, *Primary Examiner.*

A. D. HERRMANN, *Assistant Examiner.*

U.S. Cl. X.R.

192—43.2, 102